Sept. 17, 1940.   C. CRISWELL   2,214,921
VIBRATION SUPRESSING MEANS
Filed April 12, 1937   2 Sheets-Sheet 2
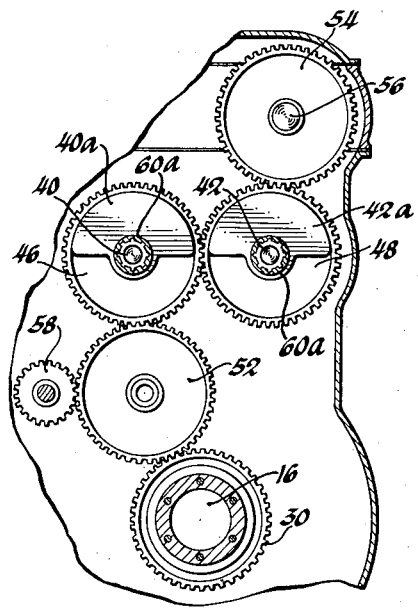
Fig. 2
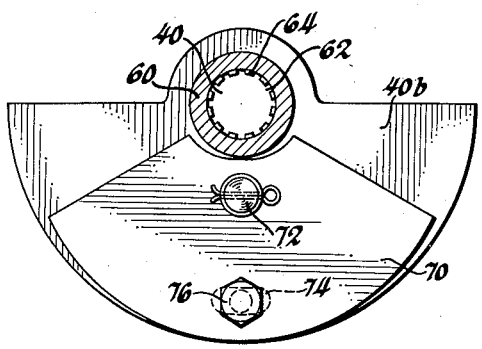
Fig. 3
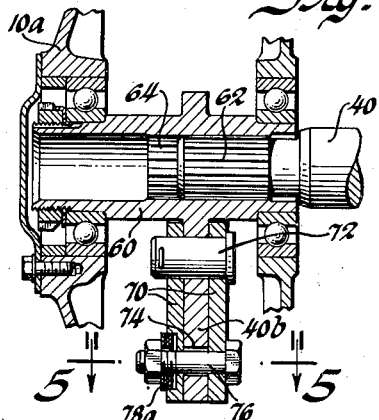
Fig. 4
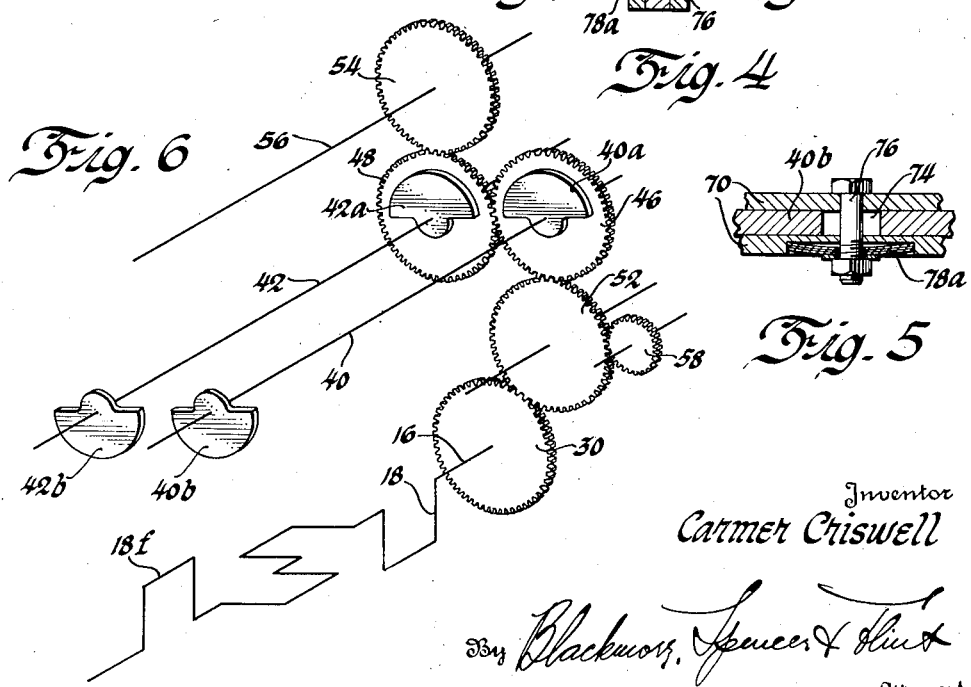
Fig. 6
Fig. 5
Inventor
Carmer Criswell
By Blackmore, Spencer & Flint
Attorneys Patented Sept. 17, 1940

2,214,921

UNITED STATES PATENT OFFICE 2,214,921

VIBRATION SUPPRESSING MEANS

Carmer Criswell, Detroit, Mich., assignor to General Motors Corporation, Detroit, Mich., a corporation of Delaware Application April 12, 1937, Serial No. 136,392

4 Claims. (Cl. 74—574)

This invention relates primarily to means for suppressing vibration incident to the operation of machinery, and more particularly to means for suppressing vibrations in internal combustion or other engines.

The invention comprises the combination of a rotary, torsionally vibrative member with a pendulumlike body eccentrically pivoted to said member and maintained in frictional contact therewith.

In the accompanying drawings in which like reference characters indicate like parts throughout the several views, Figure 1 is a side elevation of two end fragments of an engine the middle part between said fragments having been removed and the engine casing of each fragment broken away so as to reveal engine operating mechanism partly in longitudinal section.

Figure 2 is an endwise view of the gearing at the rear end of the engine as seen in section taken on the line 2—2 of Figure 1.

Figure 3 is a section on the line 3—3 of Figure 1 disclosing one of the counterbalancing shafts with vibration damping means attached at the front end.

Figure 4 is a longitudinal sectional view of one of the counterbalancing shafts showing a vibration damper of slightly modified form thereon.

Figure 5 is a detail sectional view on line 5—5 of Figure 4.

Figure 6 is a diagrammatic illustration of an engine crankshaft, parallel counterbalancing shafts, camshafts, and the gear train interconnecting them.

Figure 1:
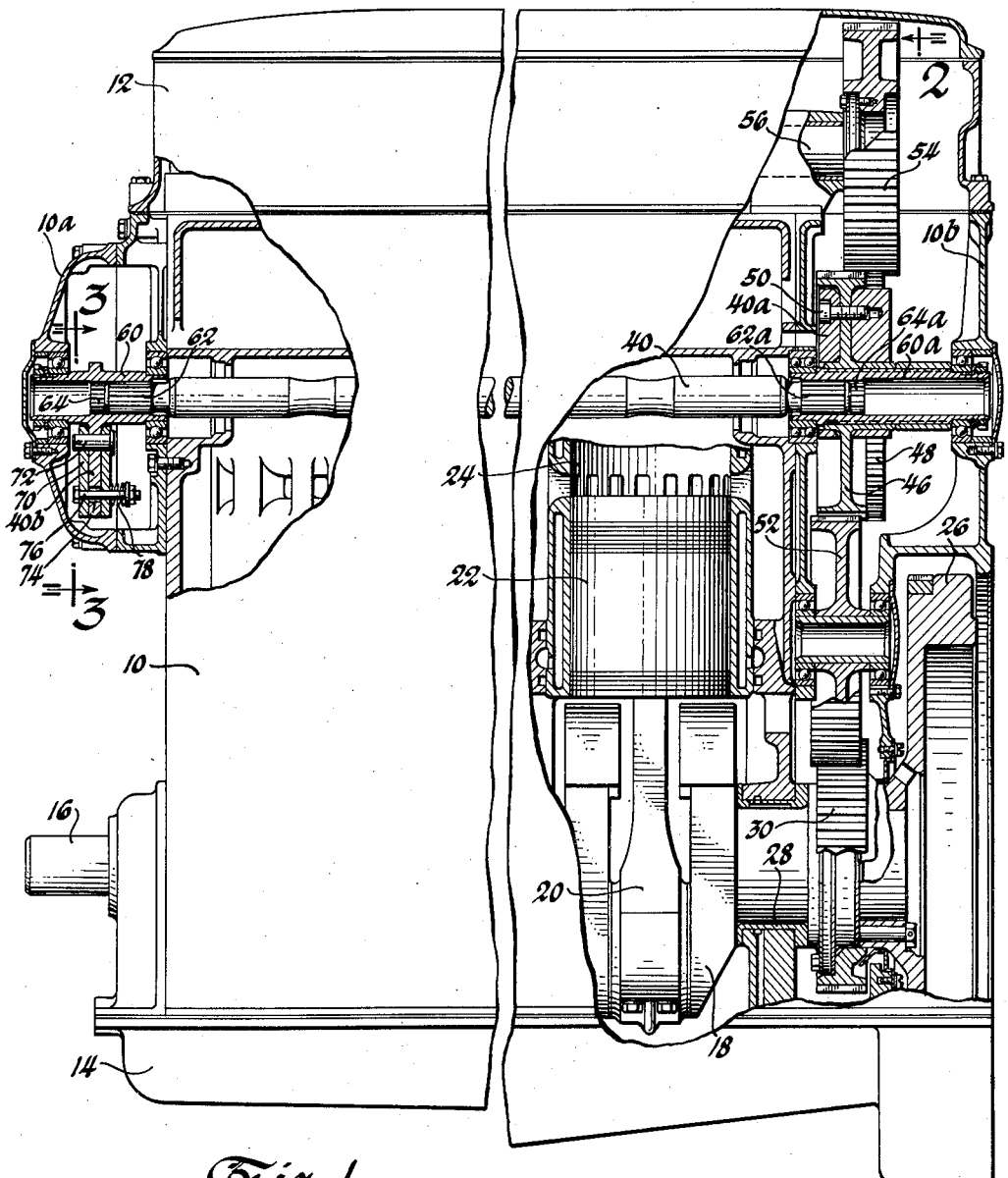

In Figure 1 numeral 10 indicates an upright multicylinder engine frame or block 12 a top cover member therefor and 14 an oil pan. This figure shows the front and rear end portions of the engine, the mid-portion having been omitted since said mid-portion is not necessary to an understanding of the invention to be disclosed. The engine crankshaft is shown at 16, suitably journalled in the engine frame or block at front and rear. The engine illustrated is a tandem four cylinder, two cycle engine of the Diesel type. This type of engine, however, is merely exemplary since the invention is well adapted to multicylinder engines of other types. One counterweighted crank is shown in Figure 1 at 18. It is to be understood that the crankshaft is counterweighted throughout so as to be in static and dynamic balance. Connecting rod 20 journalled on the crank pin of crank 18 is operatively connected to a piston 22 reciprocating in a cylinder 24. To the rear end of the crankshaft 16 the usual flywheel 26 is attached, as shown, there being a bearing 28 in the engine frame between the crank 18 and said flywheel. Between the flywheel 26 and the bearing 28 there is shown a gear 30 for operating essential parts of the engine and accessories.

In multicylinder engines of this and other types the forces applied to the crankshaft during operation develop a couple tending to oscillate the engine in the plane of the cylinder axes around a transverse axis. In order to counterbalance this rocking couple two counterweighted shafts are disposed parallel with the crank shaft and rotated oppositely one to the other. In the embodiment illustrated, said counterweighted shafts, indicated by the numerals 40 and 42, are arranged on opposite sides of a fore and aft plane that includes or is substantially parallel with the cylinder axes. Shafts 40 and 42 have at their rear ends eccentrically disposed counterweights 40a and 42a, respectively and at their front ends other eccentrically disposed counterweights 40b and 42b, the front counterweights being angularly displaced 180° from the rear counterweights. Shafts 40, 42 and crankshaft 18 are geared together so as to rotate at the same velocity and maintain the end crank pins of the crankshaft and the counterweights at the corresponding ends of the counterbalancing shafts always in opposite phase, as illustrated in the diagrammatic Fig. 6. Counterbalancing shafts 40 and 42 are provided with gears 46 and 48, respectively, secured to their rear ends, and to these gears the counterweights 40a and 42a are conveniently attached, as illustrated. As shown in Figure 1 the counterweight 40a may consist of two eccentrically disposed parts secured to the flange of gear 46 by one or more bolts 50. Counterweight 42a is a duplicate of counterweight 40a. Gear 46 is driven by a gear 52 which meshes with the aforesaid gear 30 on the crankshaft. Gear 48 is shown in this exemplary embodiment as meshing with a gear 54 secured to a valve-operating camshaft 56 arranged longitudinally of the engine within the cover member 12 in the position shown in Figures 1, 2 and 6. Gear 58, shown meshed with gear 52, operates a blower (not shown) forming a part of the engine charging system but constituting no part of this invention.

The particular engine illustrated has four cylinders and pistons arranged side by side along one side of a four throw crankshaft in which the end throws are 180° apart in the same axial plane and the two intermediate throws are 180° apart in an axial plane 90° from the plane of the end throws. The end cranks and reciprocating pistons and connecting rods tend to produce a couple the forces of which act in a plane parallel to the cylinder axes. These forces tend to rock the engine in a plane, which, in the engine illustrated, is a substantially vertical plane. The shafts 40 and 42 with their counterweights 40a, 42a, 40b and 42b, when the engine is operating, develop couples the combined forces of which are equal in magnitude and opposite in sense to the forces of the couple developed by the rotating crankshaft, the reciprocating masses of the pistons and connecting rods. Inasmuch as the counterweights on the counterbalancing shafts rotate oppositely the centrifugal forces due to the rotation of each pair of counterweights act together as their centers move upward and downward and their effects are added together, while as the centers move inward and outward the forces are subtracted one from another or balance each other, with the result that the counterweights develop only unbalanced forces that are opposite to the unbalanced forces of the reciprocating masses referred to. The mass and disposition on its shaft of each counterweight in order to counterbalance the forces of the reciprocating masses connected to the crankshaft will be selected so that the product of each mass, the radial distance of the center of mass from its center of rotation and the length of the couple arm will balance one-half the force of the opposing couple, the two masses completely balancing the opposing couple. In the drawing the front and rear counterweights on the shafts 40 and 42 are located in transverse planes respectively disposed an equal distance forward and rearward of the forward and rearward cranks of the crankshaft and thus operate with considerable mechanical advantage. Corrective mechanism of the kind illustrated may be applied to other engines having a different number of cylinders in which unbalanced forces tend to impart vibratory movements to the engine or its support. It will be understood different engines may require counterbalancing bodies of different weight and disposition in accordance with the magnitude, direction and sense of the unbalanced forces to be counteracted.

Counterbalancing shafts 40 and 42 have their front ends inserted in tubular extensions 60, as illustrated at the left of Figure 1, and in Figure 4. The front ends of said shafts are reduced and ribbed or splined longitudinally, as shown at 62 on shaft 40. These splined ends interlock with internal splines 64 in said tubular extension so that the latter are non-rotatively coupled with the shafts. The front tubular extensions 60 are journalled, as shown, in ball bearings in the engine frame 10 and in a housing part 10a bolted to the front end of the engine frame.

The rear ends of shafts 40 and 42, as is clearly illustrated with respect to shaft 40 in Figure 1, are likewise provided with tubular extensions 60a internally splined as at 64a to engage the externally splined and reduced ends 62a of said shafts. The rear tubular extensions 60a also are journalled in ball bearings seated in openings in the frame or block 10, and in a rearward housing member 10b.

The gear 46 with its counterweight 40a is secured to the rearward tubular extension 60a of shaft 40 and the gear 48 with its attached counterweight 42a is secured to a corresponding tubular extension at the rear end of shaft 42.

Reverting now to the tubular extension 60 of shaft 40 it will be seen on reference to Figures 1 and 4 that said tubular extension is formed with or has rigidly fixed to it an eccentric counterweight member 40b displaced angularly 180° from the rear counterweight 40a. This counterweight member 40b is relatively light as compared with the counterweight 40a and the necessary additional mass may consist of a movable counterweight member 70 which is composed of two parts pivotally attached to the counterweight 40b by a pivot pin 72 disposed between the axis of rotation of said counterweight and the center of mass of said member. One half of the movable counterweight member is arranged in contact with one face of the fixed counterweight member 40b and the other half on the opposite face. These faces are plane friction surfaces perpendicular to the axis. Counterweight member 40b is slotted or provided with a suitable opening therethrough located radially outward of the pivotal connection as indicated at 74. Through this opening, in the form of the invention illustrated, is passed a bolt 76 having a head at one end and a nut fitted on the other end, there being a spring 78 (shown in Figure 1 as a coil spring) disposed between the nut and the adjacent half of the damping counterweight member 70. The parts of member 70 therefore move together as one body on the counterweight member 40b which serves as a carrier for said member 70. The spring 78 applies an elastic pressure tending to move both parts of the damping member into frictional contact with the fixed counterweight member 40b. The hole or opening 74 must be of such form and size as to permit some arcuate movement of members 70 around the bolt 76 to produce friction between said members 70 and the member 40b. The fixed counterweight member 40b and the counterweight damping members revolve during operation within the housing attachment 10a, and have counterbalancing effect equal and opposite to that of counterweight 40a. Since the damping member 70 is pivoted to the counterweight member 40b at one side of its mass center so that the greater part of the mass of member 70 is on that side of pivot 72 more remote from the axis of rotation, the member 70 acts as a pendulum, centrifugal force tending constantly to maintain said member in the intermediate position of its path of oscillation as shown in Figure 3 with the centers of bolt 76, pivot pin 72 and the axis of rotation of shaft 40 (or 42) in line. No springs are required to restore the members 70 when displaced from this intermediate position. If deemed advantageous any suitable friction material may be interposed between the adjacent surfaces of the fixed counterweight members and the movable members 70.

On the front end of shaft 42, which is parallel with the shaft 40, the counterweight member 42b has a supplemental counterweight and damping member attached to it of the same construction and arrangement as described with respect to the corresponding members on the front end of shaft 40.

The modification illustrated in Figures 4 and 5 involves merely the substitution of a plate spring 78a for a coil spring 78, shown in Figure 1. The plate spring 78a illustrated consists of a plurality of rectangular strips of thin curved spring steel or equivalent.

In operation the rocking couple developed by the primary engine forces operating on the crankshaft will be counterbalanced by the counterweights 40a, 42a at one end and 40b, 42b at the other end of the shafts 40 and 42. These counterweights operate at engine speed, the counterweights 40a and 42a counterbalancing the primary force applied to the rear end of the crankshaft as at crank 18, and the counterweights 40b and 42b counteracting the opposite force applied to the other end of the crankshaft, as at crank 18f, Figure 6. The counterbalancing shafts 40 and 42 are necessarily relatively long and somewhat elastic and have with the added masses therefor a torsional vibration period of their own when excited by torque variations. If not controlled these torsional vibrations will be transmitted to the gears and induce gear noises and gear wear. Such vibrations are also transmitted to the parts operated by the train of gears extending between the crankshaft and the balancing shafts and will affect their operation disadvantageously. The tendency of the counterbalancing shafts 40 and 42 to vibrate torsionally is checked by the damping means applied to the counterweights on their front ends. As is well understood, the mass of the damping elements 70 being capable of pendulous movement relative to the members 40b and 42b, tend to oscillate in opposite phase with respect to any oscillations of said members and in so doing oppose oscillations of said members and by reason of the frictional contact described damp out any torsional vibrations that may be set up therein. Centrifugal force acting upon the pendulum-like damping members tends to keep them in a mid-position with respect to their amplitudes of movement and to restore them after having been displaced.

I claim:

1. The combination with a rotative body subject to torsional vibration, said body having a friction surface perpendicular to its axis of rotation, of a damping member pivoted eccentrically on said rotative body at a point between the mass center of said member and the axis of rotation of said body and in frictional contact with said friction surface of the latter.

2. A combination as defined in claim 1 with means for yieldably forcing said damping member into frictional contact with said friction surface of said rotative body.

3. The combination of a rotative shaft having a carrier body fixed thereto, said carrier body having opposed parallel frictional surfaces in planes perpendicular to the shaft axis, a damping member consisting of two parts pivotally mounted on said carrier at a point between the axis of rotation thereof and the center of mass of said two-part damping member, the two parts of said damping member having surfaces engaging the frictional surfaces of the carrier body between them, and adjustable means disposed radially outward of the pivotal connection between said carrier body and said damping member for holding the parts of the damping member in contact with the carrier body.

4. The combination of a rotative body subject to torsional vibration, said rotative body having a friction surface disposed in a plane perpendicular to the axis of rotation; a damping member eccentrically pivoted on said body by a pivot pin disposed radially inward of the mass center of said member, said member having a friction surface in rubbing contact with said friction surface of said rotative body, and said body having an opening located radially outward from said pivot pin, a clamping pin of less diameter than the arcuate extent of said opening passing through said damping member and opening, and elastic means cooperating with said pin tending to hold said friction surfaces together.

CARMER CRISWELL.